United States Patent
Hilberer (10) Patent No.: US 9,604,606 B2
(45) Date of Patent: Mar. 28, 2017

(54) METHOD FOR CONTROLLING A PNEUMATIC BRAKING SYSTEM

(75) Inventor: Eduard Hilberer, Hockenheim (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 2172 days.

(21) Appl. No.: 12/065,810

(22) PCT Filed: Sep. 6, 2006

(86) PCT No.: PCT/EP2006/008673
§ 371 (c)(1),
(2), (4) Date: Aug. 29, 2008

(87) PCT Pub. No.: WO2007/028586
PCT Pub. Date: Mar. 15, 2007

(65) Prior Publication Data
US 2008/0309154 A1      Dec. 18, 2008

(30) Foreign Application Priority Data

Sep. 6, 2005   (DE) .................. 10 2005 042 305
Sep. 13, 2005  (DE) .................. 10 2005 043 608

(51) Int. Cl.
| | |
|---|---|
| B60T 13/74 | (2006.01) |
| B60T 7/10 | (2006.01) |
| B60T 7/08 | (2006.01) |
| B60T 13/68 | (2006.01) |
| B60T 7/12 | (2006.01) |

(52) U.S. Cl.
CPC ............ *B60T 7/107* (2013.01); *B60T 7/085* (2013.01); *B60T 13/683* (2013.01)

(58) Field of Classification Search
CPC ......... B60T 7/085; B60T 7/107; B60T 13/683
USPC .... 303/3, 15, 20, 122, 157, 191; 701/70, 76, 701/78
See application file for complete search history.

(56) References Cited

U.S. PATENT DOCUMENTS

| | | | | |
|---|---|---|---|---|
| 4,179,166 A * | 12/1979 | Sharp et al. | ............... | 303/115.4 |
| 4,718,736 A * | 1/1988 | Fennel et al. | ................. | 303/156 |
| 5,496,099 A * | 3/1996 | Resch | ........................ | 303/114.1 |
| 5,636,907 A * | 6/1997 | Okazaki et al. | ................ | 303/10 |
| 6,062,658 A * | 5/2000 | Stumpe et al. | ............... | 303/155 |
| 6,249,737 B1 * | 6/2001 | Zipp | .............................. | 701/70 |
| 2002/0036567 A1 * | 3/2002 | Larson | .......................... | 340/442 |

(Continued)

FOREIGN PATENT DOCUMENTS

| | | | |
|---|---|---|---|
| DE | 4235113 A1 * | 4/1994 | |
| DE | 199 35 999 A1 | 2/2001 | |

(Continued)

OTHER PUBLICATIONS

* International Search Report dated Dec. 18, 2006 w/English translation (four (4) pages).

(Continued)

*Primary Examiner* — Melody Burch
(74) *Attorney, Agent, or Firm* — Crowell & Moring LLP (57) ABSTRACT

A method for controlling a pneumatic braking system of a utility vehicle that includes a service brake and an electric parking brake, an electronic control unit being provided for controlling the electric parking brake. The parking brake assists a brake intervention of the utility vehicle when there is a circuit failure of the service brake.

14 Claims, 12 Drawing Sheets

(56) References Cited

U.S. PATENT DOCUMENTS

2004/0195910 A1  10/2004  Aumuller et al.
2005/0029859 A1   2/2005  Bensch et al.

FOREIGN PATENT DOCUMENTS

| DE | 199 53 805 C1 | 6/2001 |
| DE | 199 62 556 A1 | 7/2001 |
| DE | 100 33 835 A1 | 1/2002 |
| DE | 103 14 642 B3 | 11/2004 |
| DE | 103 36 611 A1 | 3/2005 |
| DE | 10 2004 015 710 A1 | 7/2005 |
| EP | 1 504 975 A | 2/2005 |

OTHER PUBLICATIONS

PCT/IB/338 & International Preliminary Report on Patentability (seven (7) pages).

* cited by examiner

METHOD FOR CONTROLLING A PNEUMATIC BRAKING SYSTEM

CROSS-REFERENCE TO RELATED APPLICATIONS

This application is the national phase filing of PCT International Application No. PCT/EP2006/008673, filed Sep. 6, 2006, which claims priority under 35 U.S.C. §119 to German Patent Application Nos. 10 2005 043 608.0, filed Sep. 13, 2005, and 10 2005 042 305.1, filed Sep. 6, 2005, the entire disclosures of which are herein expressly incorporated by reference.

This application contains subject matter related to copending U.S. patent application Ser. No. 12/065,868, filed Mar. 5, 2008, and Ser. No. 12/065,812, filed Mar. 5, 2008.

BACKGROUND AND SUMMARY OF THE INVENTION

The invention relates to a method for controlling a pneumatic brake system of a utility vehicle having a service brake and an electric parking brake, wherein an electronic control unit is provided for controlling the electric parking brake.

Such devices and methods are becoming increasingly important in the context of operating utility vehicles. In terms of the further development of the systems, emphasis is placed on various aspects, in particular operating comfort and safety.

Since safety aspects play a decisive role in particular in utility vehicles, emphasis has been placed on efforts to improve safety. These efforts relate in particular to the brake system, and in the event of a defect in one of the brake circuits it is necessary to ensure that the vehicle nevertheless comes to a standstill safely. However, if one of the service brake circuits fails it is firstly unavoidable that braking operations occur with a reduced overall braking force. The possibility of hazardous situations occurring is therefore not ruled out.

The invention is based on the object of improving the safety of the brake system of a utility vehicle with respect to the possible failure of a service brake circuit.

The invention is also based on the object of improving the operating comfort of an electric parking brake.

The invention builds on the prior art in that, in the case of a circuit defect in the service brake, braking of the utility vehicle is assisted by the parking brake. Since the electric parking brake is actuated by an electronic control unit which is integrated into the control system of the utility vehicle, and is in particular connected to the CAN bus, it is possible for the electronic brake controller to issue a request to the electronic control unit of the parking brake, and the parking brake then assists the braking operation. Consequently, even when there is a circuit defect, it is possible to bring the vehicle to a standstill with a comparatively high braking force, and at any rate the braking force here is higher than if the braking force of a single service brake circuit were relied on.

The braking assistance is provided by the parking brake by virtue of the fact that the spring-loaded cylinders of the parking brake are vented in accordance with a predefined time/pressure characteristic curve. This makes it possible to apply the parking brake gently. This is advantageous since sudden venting of the spring-loaded cylinders should be carried out only at extremely low speeds of the utility vehicle. Rapid venting of the spring-loaded cylinders at high speed would very probably lead to an accident. However, if a time/pressure characteristic curve, which is sufficiently flat is prescribed, the parking brake can be used to provide assistance even at relatively high speeds.

In this context. it is useful that different time/pressure characteristic curves are used as a function of the speed of the utility vehicle.

The invention is also advantageously developed in that different time/pressure characteristic curves are used as a function of the faulty brake circuit of the utility vehicle. In the event of a failure of a brake circuit, the braking effect of an axle of the utility vehicle, which is assigned to this brake circuit, does not occur. Depending on whether the axle is a front axle or a rear axle, different assisting braking effects of the parking brake are desired.

According to a further embodiment of the present invention, further conditions have to be met for the parking brake to close, specifically a switched on ignition and a sufficiently low speed of the utility vehicle. Even if assistance is to be provided even at a high speed, specifically through the use of a suitable time/pressure characteristic curve, checking for a sufficiently low speed is a measure which improves safety.

In this context, it is useful that the presence of a sufficiently low speed of the utility vehicle is determined by comparing the wheel speed, the vehicle speed output of a controller and the rotational speed of the transmission with predefined threshold values. The wheel speed can be determined directly by way of a sensor, the vehicle speed is generally available as an output value of a controller and it is generally input into the CAN bus, and the rotational speed of the transmission is supplied by the electronic transmission controller and is preferably superimposed on the CAN bus.

BRIEF DESCRIPTION OF THE DRAWINGS

The invention will now be explained by way of example by means of a particularly preferred embodiment and with reference to the appended drawings.

DETAILED DESCRIPTION OF THE DRAWINGS

In the following description of the preferred embodiments of the invention, identical reference symbols denote identical or comparable components.

Figure 1:
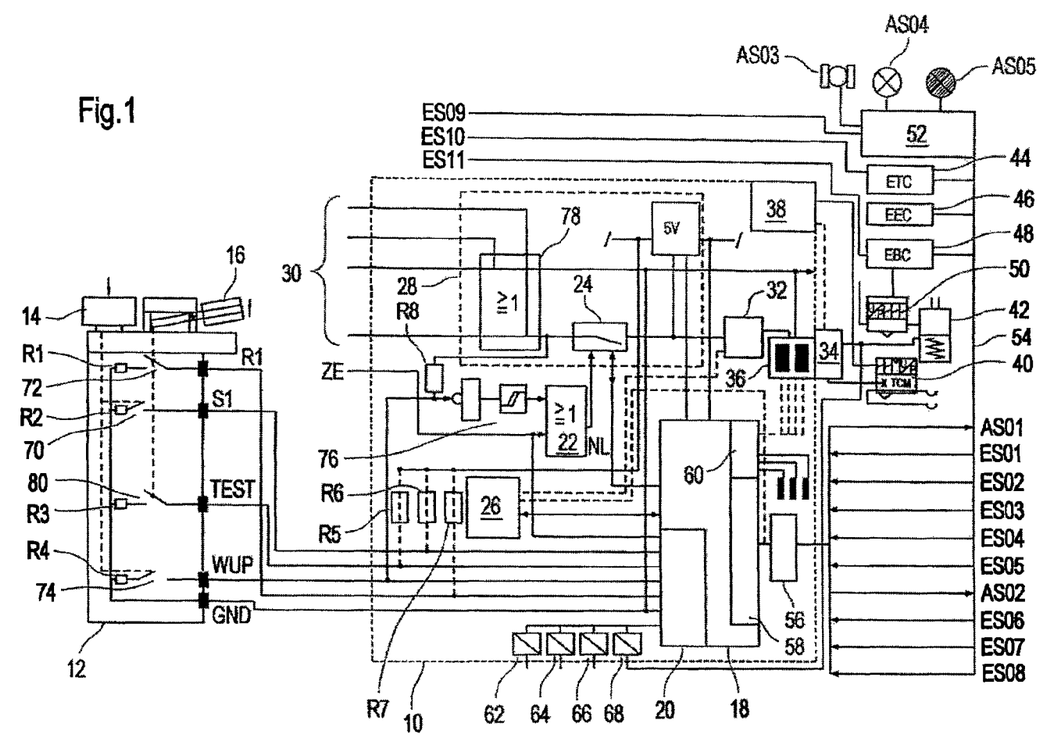
FIG. 1 is a circuit diagram providing a schematic illustration of a first embodiment of an activation device for a manual control unit.

FIG. 1 is a circuit diagram explaining a device with a schematic illustration of a first embodiment of an activation device for a manual control unit. An electronic control unit (ECU) 10 is illustrated. The ECU 10 contains a microcontroller 18 and a watchdog timer 26. The watchdog timer 26 is used to monitor the microcontroller 18, and it contains a second microcontroller for this purpose. Redundancy can be made available owing to the presence of two microcontrollers.

Furthermore, a power unit 28 is provided, to which voltage can be fed from a double, that is to say redundant, voltage supply. The power unit 28 supplies, in particular, the microcontroller 18 with a stable voltage of preferably 5 V. A shutdown relay 32 is also provided. The shutdown relay 32 is able to place the system, in particular the solenoid valves 36 which transmit the switching functions of the parking brake pneumatics 34, in a secured state, initiated by the watchdog timer 26.

An EAC (electronic air conditioning system) pneumatic interface 38 and devices in the periphery of the electronic control unit 10 are also illustrated. For example, the EAC pneumatic interface 28 is, apart from its connection to the parking brake pneumatics 34, also connected to the trailer control module 40. The trailer control module 40 is also connected to the parking brake pneumatics 34, in particular in order to implement a test function, which will be described below. There is a further connection of the parking brake pneumatics 34 to the spring-loaded cylinders 42 of the parking brake, one of which is illustrated by way of example.

Further peripheral components are an electronic transmission controller (ETC) 44, an electronic engine controller (EEC) 46 and an electronic brake controller (EBC) 48. The electronic brake controller 48 is connected to a modulator 50 by which the pressure in the spring-loaded cylinders 42 can be changed. Furthermore, a central electronic control unit 52 is provided, which can also be implemented within the scope of a vehicle control computer or central on-board computer. The central electronic controller 52 receives, for example, signals ES09 which characterize the state of the doors and the occupancy of the seats. Relevant output signals in the context of the present invention are, for example, a parking signal AS03, a warning or fault signal AS04 and a stop signal AS05, which is output, for example, when the handbrake is pulled on during the stop and go mode.

The electronic transmission controller 44 receives, for example, signals ES10 which characterize the state of the transmission and state of the clutch, the selected gear speed and the rotational speed of the cardan shaft. The electronic brake controller 48 receives, for example, signals ES11 relating to the brake pedal situation and the service brake pressure. The aforesaid control units 44, 46, 48, 52 are connected via a CAN bus 54 to a CAN interface 56 of the electronic control unit 10. Via this CAN interface 56, a plurality of input signals can be transmitted to the microcontroller 18 via its CAN interface 58. Output signals can also be output.

The following signals, inter alia, are possible:
ES01: A request for activation of the electric parking brake.
ES02: The vehicle speed.
ES03: The position of the accelerator pedal and a signal from an inter-vehicle distance controller.
ES04: A brake pedal position.
ES05: A state of the electronic transmission controller, in particular with respect to deceleration.
ES06: The state of the transmission and of the clutch, which are output by the electronic transmission controller.
ES07: The wheel speed.
ES08: The state of the electronic engine controller.
Possible output signals are, in particular:
AS01: a state signal which is output to the on-board diagnostic and refers to the electric parking brake.
AS02: a request from the electronic brake controller for assistance to be provided to the service brake.

In addition to the CAN interface 58, the microcontroller 18 also has direct digital and/or analog outputs 60, in particular for actuating solenoids which provide access to the pneumatic controller.

The electronic control unit 10 also has pressure sensors 62, 64, 66, 68. The pressure sensors 62, 64 sense the pressure in the service brake circuits. The pressure sensor 66 is assigned to the trailer brake system. The pressure sensor 68 is used to measure the pressure in the spring-loaded cylinders.

Further components are provided which relate to the operation of the manual control unit 12 and which are explained with reference to the following description of the method of operation of the manual control unit 12 and its interplay with the electronic control unit 10.

The manual control unit 12 has two operator control elements 14, 16. The operator control element 14 is used to close the parking brake by pressing, while the operator control element 16 is used to open the parking brake by pulling. For the purpose of closing the parking brake, the operator control element 14 is coupled to a switch 70. If this switch is closed, a signal S1 is output to the analog/digital converter 20 of the microcontroller 18. For the purpose of releasing the parking brake, the operator control element 16 is coupled to the switch 72. If the switch 72 is closed, a signal R1 is output to the analog/digital converter 20 of the microcontroller 18.

In addition to its coupling to the switch 70, the activation element 14 is, however, also coupled to the switch 74. The switch 74 is used to generate a wakeup signal WUP, which is also output to the analog/digital converter 20 of the microcontroller 18. The wakeup signal WUP is, however, also fed to a Schmitt trigger circuit 76. The output signal of the Schmitt trigger circuit 76 is fed to a switching logic 22, which outputs an output signal whenever at least one input signal is present. An "ignition on" signal ZE, that is to say in the simplest case a voltage which is present whenever the ignition is switched on, is also fed to the switching logic 22. The output signal of the switching logic 22 influences a switch 24, which is integrated into the power unit 28. If either the "ignition on" signal ZE or the wakeup signal WUP is present, the switch 24 is closed so that the parking brake system, and in particular the microcontroller 18, are supplied with a voltage. The double supply voltage 30 is, for this purpose, fed within the power unit 28 via a coupling element 78, which generally ensures that the higher voltage of the redundant voltage supply 30 is used to supply the parking brake.

In a similar way to how the switch 74 for generating the wakeup signal WUP is assigned to the activation element 14 as well as being coupled to the switch 70 for closing the parking brake system, the switch 80 is assigned to the activation element 16 for releasing the parking brake as well as to the switch 72. When this switch 80 is closed, a signal TEST is generated, which is fed to the analog/digital converter 20 of the microcontroller 18 so that on this basis it is possible to check whether the towing vehicle alone is able to stop the entire vehicle train composed of a towing vehicle and trailer. The switch 80 is advantageously also used as a redundancy switch for the switch 72. In the same way, the switch 74 can be used as a redundancy switch for the switch 70.

Furthermore, resistors R1, R2, R3, R4, R5, R6, R7 and R8 are also provided in the manual control unit 12 and the electronic control unit 10 and are dimensioned in such a way that the suitable signals are fed to the microcontroller 18 and the Schmitt trigger circuit 76. For example, through the closing of the switch 72, the input of the analog/digital converter 20 of the microcontroller 18, which is connected to said switch, is connected to ground GND via the resistor R1 so that as a result a signal is generated. When the switch 72 opens, the corresponding input is connected again to the positive potential of the power unit 28 via the resistor R7.

Figure 2:
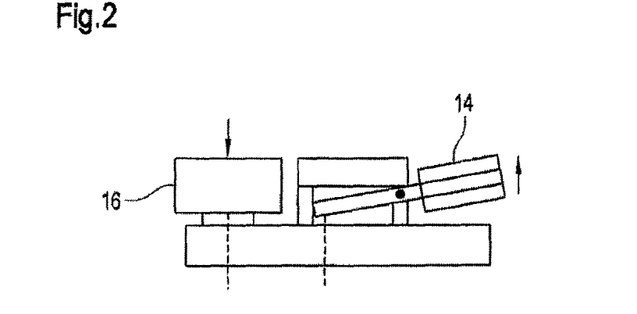
FIG. 2 shows a second embodiment of an activation device for a manual control unit.

As in the embodiment according to FIG. 1 in which the parking brake is closed by pressing and opened by pulling, in the activation device according to FIG. 2 there is provision for the parking brake to close by pulling the activation element 14 and to open by pressing the activation element 16.

Figure 3:
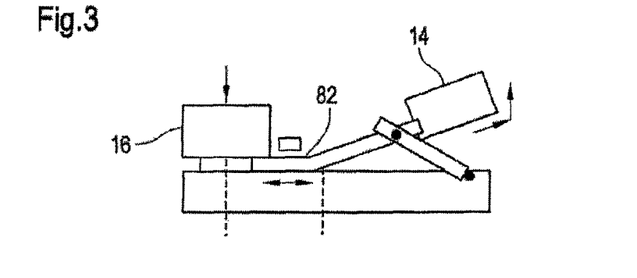
FIG. 3 shows a third embodiment of an activation device for a manual control unit.

In FIG. 3 also, the parking brake is closed by pulling the activation element 14 and opened by pressing the activation element 16. A bolt 82 is additionally provided, which bolt 82 prevents the pressing of the activation element 16 if the activation element 14 is not pulled at the same time. In this way, the parking brake can be released only if both activation elements 14, 16 are activated simultaneously. This provides additional safety.

Figure 4:
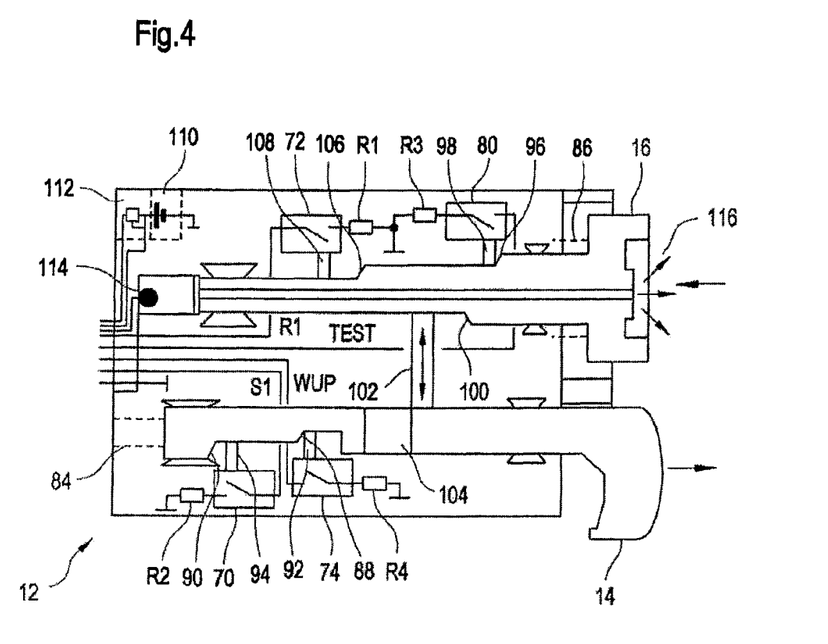
FIG. 4 is a schematic illustration of a manual control unit which can be used within the scope of the present invention.

FIG. 4 is a schematic illustration of a manual control unit which can be used within the scope of the present invention. The manual control unit 12 has an activation element 14, which triggers switching functions by pulling, and an activation element 14 which triggers switching functions by pressing. The activation element 14 is directly or indirectly connected to a housing of the manual control unit via a tension spring 84. The activation element 16 is directly or indirectly connected to the housing of the manual control unit 12 via a compression spring 68.

The activation element 14 can be readily activated. Since the activation element 14 is pulled counter to the force of the tension spring 84, the switch 74 closes first so that in this way the signal WUP is output to the microcontroller (see FIG. 1). This signal WUP serves as a wakeup signal if an ignition system is switched off. Likewise, it also serves as a redundant signal to the signal S1 which is subsequently generated by further pulling of the activation element 14, which signal S1 causes the parking brake to close owing to the closing of the switch 70. The activation of the switches 74, 70 takes place due to corresponding slopes 88, 90 on the activation element 14, which act on spring-prestressed momentary contact switches 92, 94 which are assigned to the switches 70, 74.

The activation element 16 can firstly be readily activated, specifically by virtue of the fact that it is pressed against the force of the compression spring 86. The slope 96 on the activation element 16 activates the spring-prestressed momentary contact switch 28 so that the switch 80 is closed. The trailer test function can be carried out in this way. However, if the activation element 16 is to be moved further, the slope 100 of the activation element 16 impacts against a blocking element, specifically a spring-centered sliding block 102. The activation element 16 can therefore not move any further. Only simultaneous activation of the activation element 14 causes an opening 104 in the activation element 14 to be arranged in such a way that the sliding block 102 is aligned with the opening 104. Consequently, the force which is exerted on the sliding block by the activation element 16 causes the sliding block 102 to slide into the opening 104. After this sliding process has taken place, the activation element 16 is pressed further and, owing to the force effect of the slope 106 on the spring-prestressed momentary contact switch 108, it can activate the switch 72 to open the parking brake. Therefore, as a result of the activation of the activation element 16, the signals TEST and R1 are generated in succession, and the signal R1 can be generated here only after mechanical release of the sliding block 102 as a result of pulling out the activation element 14.

The manual control unit furthermore optionally includes an accumulator 110 and an assigned control unit 112. Furthermore, an LED 114 is optionally provided. The LED 114 is able to output light signals 116 via a duct which extends in the axial direction of the activation element 16. Such light signals can, for example, request the driver to carry out the trailer test function. It is also contemplated for warning signals or status signals to be output by way of the light signals 116.

FIGS. 5 to 11 illustrate various sequences in the brake system of a utility vehicle, which are related to an electric parking brake of the type described. Processes are explained in which certain effects (W01 W09) depend on certain conditions (B01-B30) and their logical combination. For reasons of clarity, these conditions and effects are firstly listed below in caption form. This list is followed by a detailed description.

B01: Wheel speed <x rpm.
B02: Vehicle speed <x km/h.
B03: Rotation speed of transmission <x rpm.
B04: On-board diagnostics not signaling any fault.
B05: Switch 70 of manual control unit is closed and/or signal S1 is present.
B06: Ignition is switched on and/or signal ZE is present.
B07: Ignition is switched off, run on.
B08: Gear selector lever in parking position.
B09: Parking brake is closed.
B10: Switch 80 of manual control unit is closed and/or signal TEST is present.
B11: Switch 72 of manual control unit is closed and/or signal R1 is present.
B12: Service brake is activated.
B13: Engine is not running.
B14: Engine is running.
B15: Predefined minimum brake pressure of service brake is present.
B16: Service brake active over predefined minimum time period t1*.
B17: Accelerator pedal not active.
B18: Clutch and/or drive train open.
B19: Additional braking request.
B20: Predefined distance from vehicle traveling in front is undershot.
B21: Vehicle begins to move or wishes to begin to move.
B22: Clutch and drive train closed with permissible gear speed.
B23: Accelerator pedal requests engine speed.
B24: Predefined engine torque is reached.
B25: Vehicle has been previously braked in stop-and-go mode.
B26: Ignition and doors have not been activated after the last braking operation.
B27: Switch 74 of manual control unit is closed and/or signal WUP is present.
B28: On-board diagnostics signaling circuit defect.

B29: Electronic brake controller (EBC) makes assistance request to electronic control unit of the parking brake.
B30: Vehicle is moving.
W01: Electric parking brake is closed according to predefined time/pressure characteristic curve; closes completely when vehicle is stationary.
W02: Electronic control unit activates solenoid valve for test function; assistance by service brake if vehicle is moving.
W03: Electric parking brake is opened.
W04: Electric parking brake is closed.
W05: Electric parking brake is opened according to predefined time/pressure characteristic curve.
W06: Service brake pressure rises with small gradient.
W07: Service brake pressure rises with relatively large gradient.
W08: Electric parking brake is closed according to predefined time/pressure characteristic curve when service brake is activated.
W09: Electronic control unit sends interrogation to electronic brake controller (EBC) to carry out a braking operation according to predefined time/pressure characteristic curve.

Figure 5:
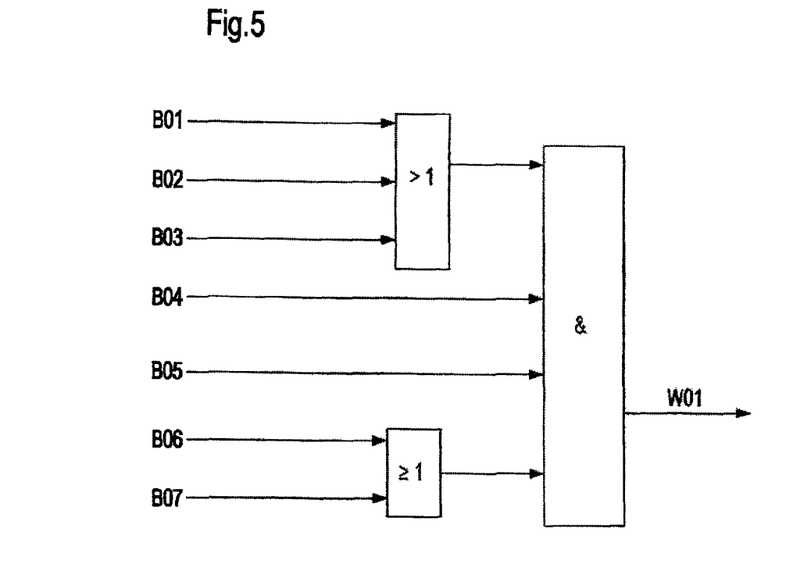
FIG. 5 is a diagram illustrating a parking procedure using an electric parking brake.

FIG. 5 illustrates a normal parking procedure using an electric parking brake. The electronic control unit checks whether conditions B01 to B07 are met and combines these conditions logically and influences the electric parking brake as a function of the result of these logic operations. At first, it is checked whether at least two of the conditions B01-B03 are met, that is to say whether the wheel speed is below a predefined rotational speed, the vehicle speed is below a predefined value and the rotational speed of the transmission is below a specific value. If at least two of these criteria are present, a signal is output to the illustrated AND logic operation. For this control process and for further control processes described here it is also possible to provide that it is sufficient for one of the conditions to be met. Further conditions to be checked are whether condition B04 is met, that is to say whether the on-board diagnostics are not signaling a fault, and checking of the condition B05, that is to say whether the switch 70 of the manual control unit is closed or, in other words, whether the signal S1 is present.

Furthermore, it is checked whether at least one of the conditions B06 and B07 is met, specifically whether either the ignition is switched on (condition B06) or whether the ignition is switched off but the electronic control unit is in its run on mode. If this checking of the conditions B01 to B07 on the basis of the described logic combinations leads to positive results, this has the effect W01 on the electric parking brake, and the latter is then closed according to a predefined time/pressure characteristic curve; and the parking brake is closed completely when the vehicle is stationary. These relationships are explained in the functional diagrams, in which the service brake pressure pB is plotted against time t in one of the diagrams, while in the other diagram the pressure pF, which is measured in the spring-loaded cylinders of the parking brake, is plotted against the time t. It is apparent that the service brake pressure firstly rises to a predefined value p2 up to the time t1. The pressure in the spring-loaded cylinders pF then drops from a value pF1 to a value pF2 up to the time t2, wherein the value pF2 corresponds to a closed parking brake. This pressure profile, of which one is illustrated here in a simple form, can, under certain circumstances, have varied forms. For example, it is possible that after the time t1 the pressure pF in the spring-loaded cylinders firstly drops slowly in accordance with a time/pressure characteristic curve, and the vehicle comes to a complete standstill before the parking brake closes completely, and from this time the further pressure drop in the spring-loaded cylinders can occur more quickly. It will also frequently be the case that at the time t1, the vehicle is already completely stationary so that subsequent to this the spring-loaded cylinders can be vented quickly immediately.

Figure 6:
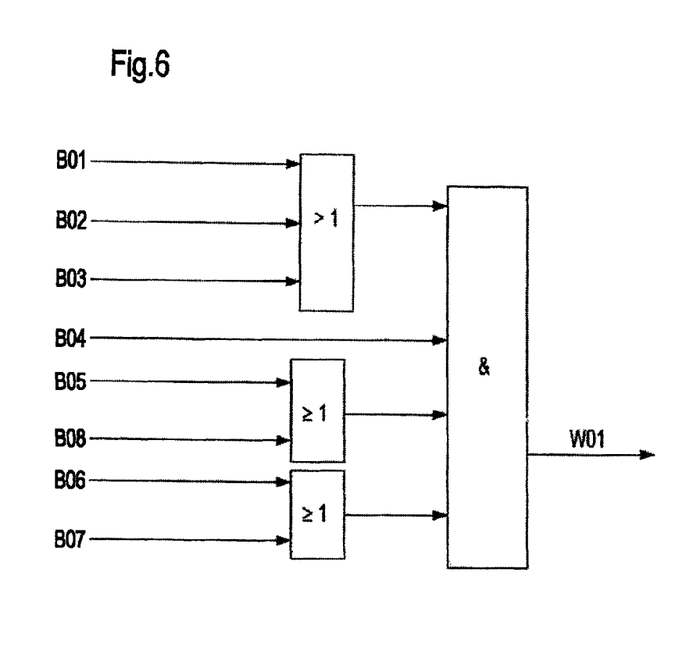
FIG. 6 is a diagram illustrating a further parking procedure using an electric parking brake.

FIG. 6 shows a preferred variant of the application of the electric parking brake in a normal parking procedure. According to FIG. 6, it is then no longer absolutely necessary for the condition B05, specifically the closing of the switch 70 of the manual control unit, to be met. Instead, the electric parking brake can then also be closed without further action on the part of the driver if the gear shift selector lever of the vehicle is in the parked position.

Figure 7:
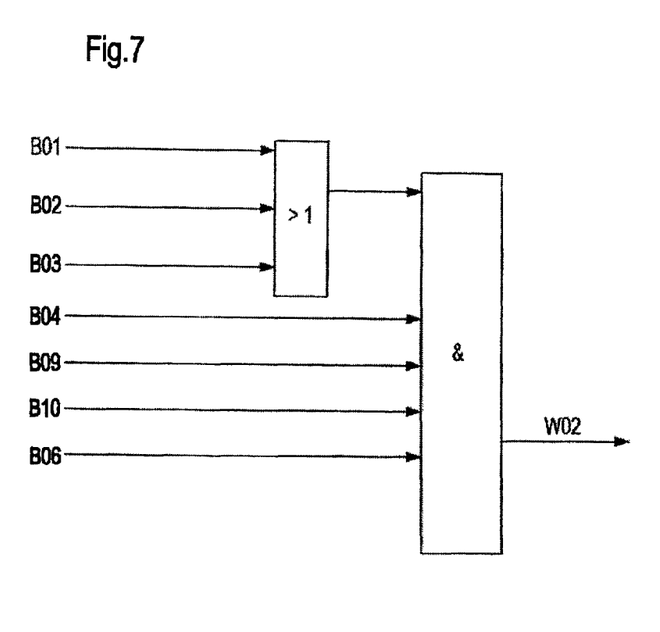
FIG. 7 is a diagram illustrating a trailer test function using an electric parking brake.

A method which is used to check the parking brake in a utility vehicle which is equipped with a trailer is explained with reference to FIG. 7. It is checked whether the utility vehicle is able to stop the entire vehicle train independently with the parking brake applied. This provides additional safety in the case of a utility vehicle which is parked on a slope. In addition to the conditions which have already been explained in relation to FIGS. 5 and 6, the condition B09, that is to say whether the parking brake is closed, is now checked. Furthermore, according to condition B10, the switch 80 of the manual control unit must be closed, in other words the signal TEST must be present. If the logic combinations produce a positive result, the effect W02 occurs, that is to say the electronic circuit activates the solenoid valve for the test function. Furthermore, assistance is provided by the service brake if the vehicle is moving. These conditions are, in turn, clarified by way of two diagrams, the pressure in the spring-loaded cylinders pF being plotted over time in one diagram, while in the other diagram a pressure p43, which is measured at the trailer control module TCM and is plotted over time t, is shown. Starting from the time t1, both the spring-loaded of the towing vehicle and the spring-loaded cylinders of the trailer are vented, which is apparent from the drop in the pressure pF and the drop in the pressure p43. At a later time t2, the spring-loaded cylinders of the trailer are pressurized once more for a certain time interval Δt.

Figure 8:
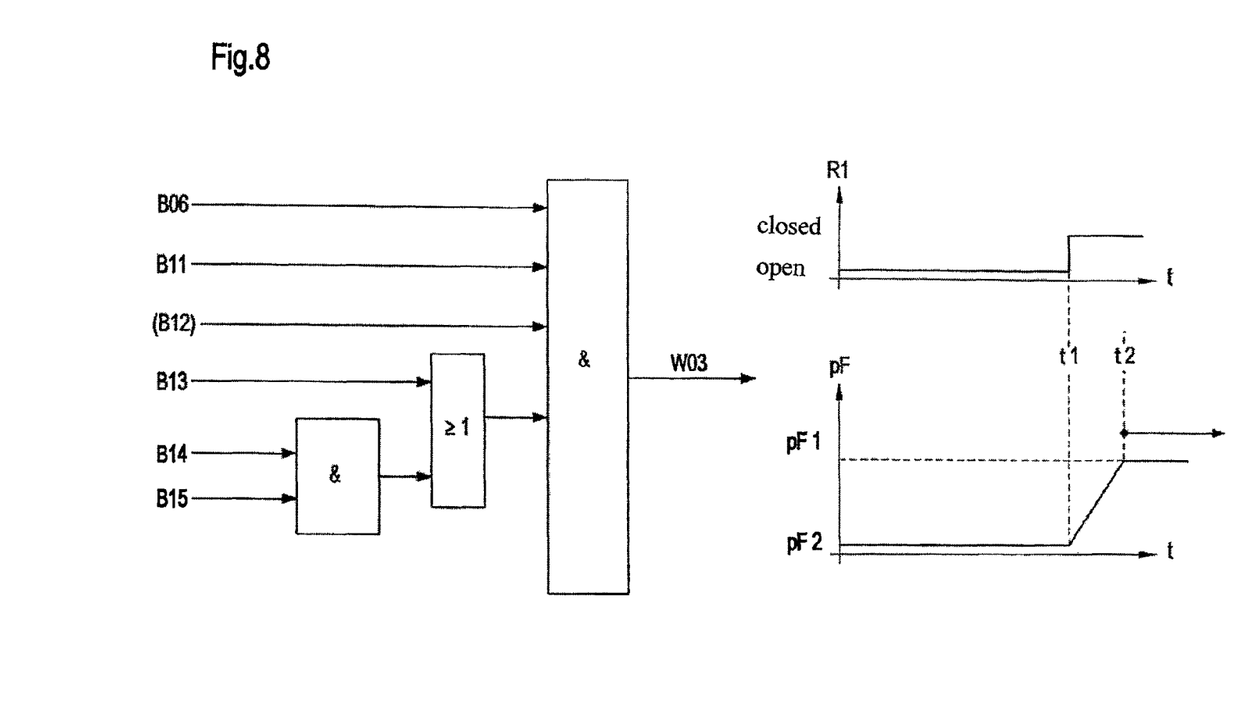
FIG. 8 is a diagram illustrating a release process of an electric parking brake.

FIG. 8 illustrates the normal release of the electric parking brake after the utility vehicle parks. The ignition must be switched on (B06) and the switch 72 of the manual control unit must be closed, in other words the signal R1 must be present (B11), and optionally it is possible to check whether the service brake is activated (B12). If, in addition, the condition B13 is met, that is to say the engine is not running, the effect W03 can be triggered, specifically the opening of the electric parking brake. If the engine is running (B14), it is additionally necessary to check whether a predefined minimum brake pressure of the service brake is present. This is explained once more in the functional diagram. As long as the signal R1 is not present when the switch 72 is opened, the pressure in the spring-loaded cylinders pF remains at the level p2. After the switch closes at the time t1, the pressure in the spring-loaded cylinders rises to the level pF1. As a result, the vehicle can begin to move, which is indicated by the arrow starting from t2.

Figure 9:
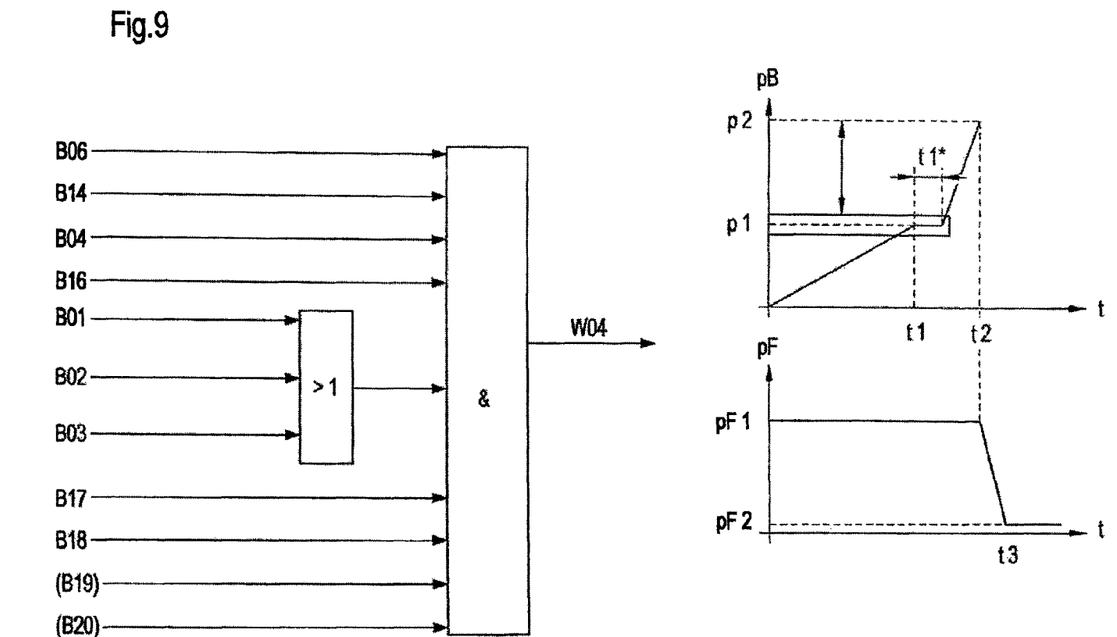
FIG. 9 is a diagram illustrating the use of an electric parking brake when stopping during a stop and go mode.

The stop and go mode, which is assisted by the electric parking brake, will be explained with reference to FIG. 9. Again, at least two of the conditions B01 to B03 must be met in order to be able to assume with sufficient certainty that the parking brake will not close at an excessively high speed. Further obligatory conditions are the conditions B04, B06 and B14, which have already been explained above. In addition, the service brake must be active over a predefined minimum time period t1* (B16). It is then also checked whether the accelerator pedal is not active (B17) and whether the clutch and/or the drive train are open (B18). Optionally, it is also possible to interrogate the conditions B19 and B20, specifically to determine whether an additional braking request is present and/or whether distances from a vehicle traveling in front in a way which is characteristic of a stop and go mode are undershot. The electric parking brake can then be closed (W04) as a function of the described check. The pressure profile in the functional diagrams illustrates this. When the vehicle stops during a stop and go mode, the service brake pressure pB is firstly increased to t1, for which a tolerance range is indicated. If this service brake pressure is subsequently maintained over the time period t1* and if the brake pressure subsequently continues to increase to the pressure p2, the spring-loaded cylinders are automatically vented after the time t2, with the result that the parking brake is closed at the time t2. However, it is also contemplated that, in contrast to the diagrams, the spring-loaded cylinders are already vented, and the parking brake is therefore closed, after the expiry of the time period t1*, that is to say the system does not additionally wait until the driver increases the brake pressure by further activating the brake pedal.

Figure 10:
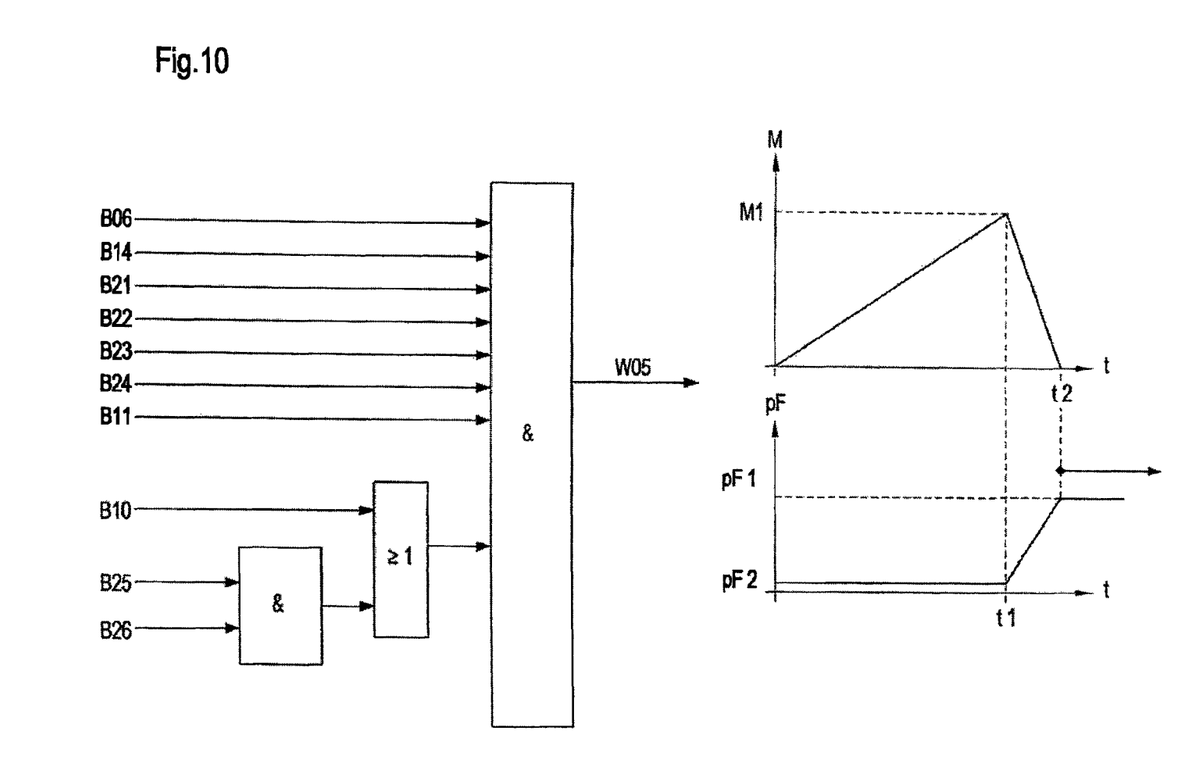
FIG. 10 is a diagram illustrating the use of an electric parking brake when driving off during a stop and go mode.

FIG. 10 illustrates driving off during the stop and go mode. In addition to the conditions B06, B11 and B14, which have already been explained above, it is checked whether the vehicle begins to move or wishes to begin to move (B21), whether the clutch and the drive train are closed with a permissible gear speed (B22), whether the accelerator pedal requests an engine speed (B23), and whether a predefined engine torque is reached (B24). In addition, either the conditions B25 and B26 have to be met simultaneously, that is to say the vehicle has previously been braked in the stop and go mode and the ignition and the doors have not been activated after the last braking operation, or the condition B10 which has already been mentioned above must be met, that is to say the switch 80 of the manual control unit must be closed, with the result that the signal TEST is present. Depending on the check, the effect W05 then occurs, with the result that the electric parking brake is opened in accordance with a predefined time/pressure characteristic curve. By virtue of this method, the driver is then enabled to release the parking brake in the stop and go mode by merely triggering the signal TEST. In particular, if the manual control unit is configured in such a way that the actual release function (signal R1) can be brought about only with both hands, issuing the signal TEST makes operation considerably easier in the stop and go mode. The diagrams show the rising engine torque M up to a value M1 at the time t1 and the subsequent pressurizing of the spring-loaded cylinders from a pressure pF2 to a pressure pF1, with the result that the vehicle can drive off after a time t2, indicated by the arrow starting from t2.

Figure 11:
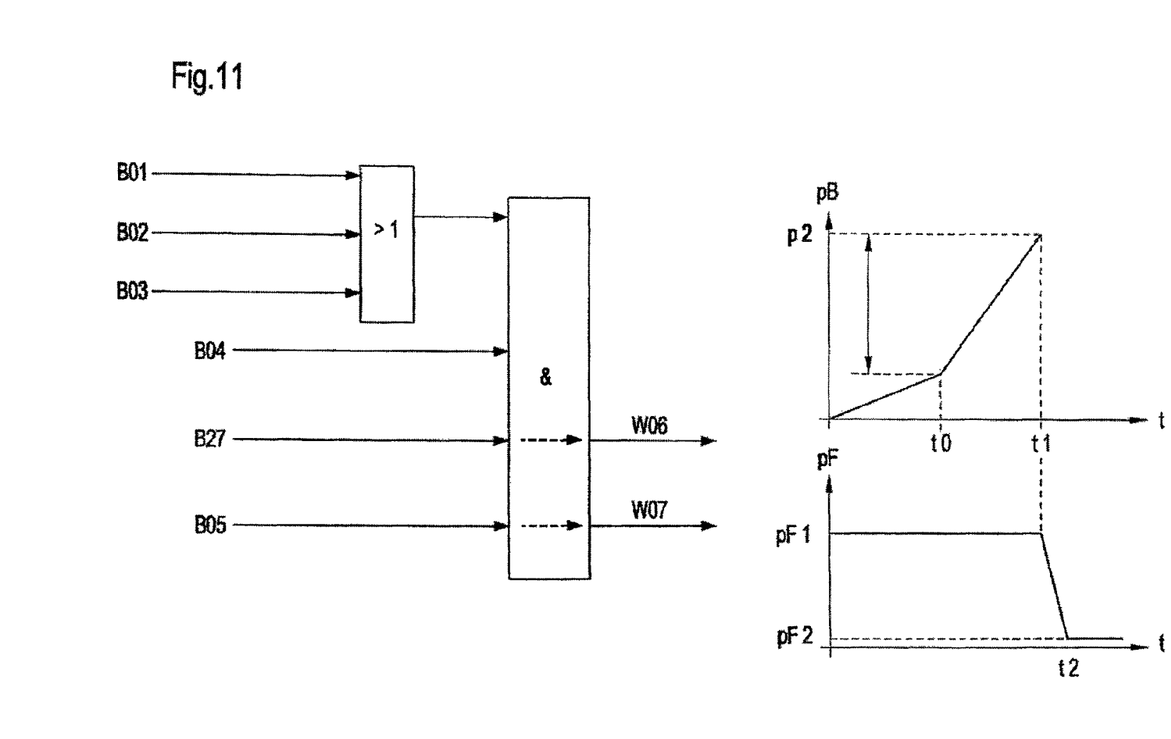
FIG. 11 is a diagram illustrating the deceleration of a vehicle using an electric parking brake.

FIG. 11 illustrates what is required for the utility vehicle to be decelerated by the electric parking brake. Firstly, it is again necessary to check, by way of checking the conditions B01 to B03 which have already been explained, whether the vehicle is traveling sufficiently slowly. Furthermore, according to condition B04, the on-board diagnostics must not be signaling a fault. If the condition B27 is present at first, that is to say the switch 74 of the manual control unit is closed, in other words the signal WUP which is actually provided as a wakeup signal is present, the service brake pressure can, in accordance with the effect W06, first rise with a small gradient. This is shown in the diagram, which plots the service brake pressure pB over time t. At a time t0, the condition B05 may be met so that, according to the effect W07, the service brake pressure increases with the relatively large gradient up to the time t1. Since according to the condition B05 the signal S1 is present, the spring-loaded cylinders can subsequently also be vented between the times t1 and t2, which is shown by the pressure drop from pF1 to pF2.

Figure 12:
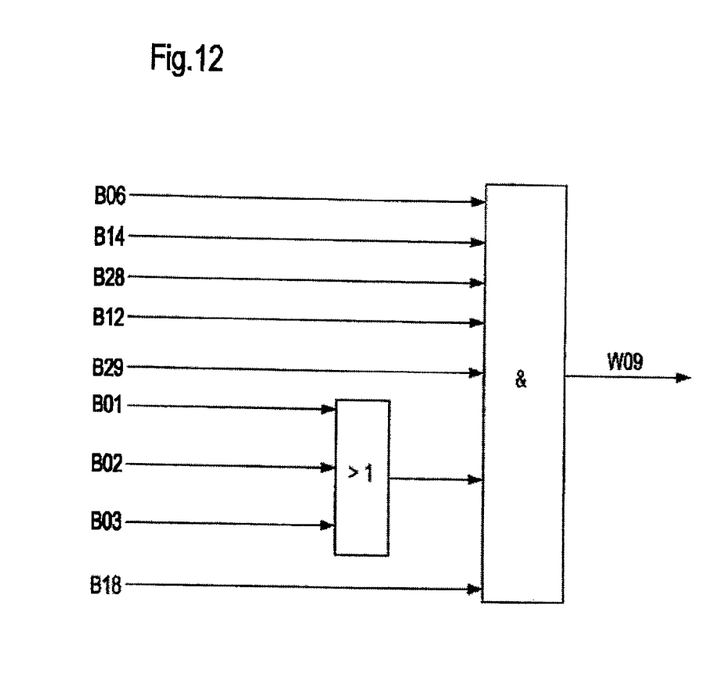
FIG. 12 is a diagram illustrating the assistance provided to a service brake by an electric parking brake.

The assistance provided to the service brake by the electric parking brake in the event of a circuit defect is explained with reference to FIG. 12. According to the checking of the conditions B01 to B03 which has already been explained, this assistance is possible only at a low speed of the vehicle. Necessary conditions are a switched on ignition (B06), a running engine (B14), an active service brake (B12), and an open clutch and/or an open drive train (B18). If the on-board diagnostics also signal a circuit defect (B28) and if the electronic brake controller (EBC) makes an assistance request to the electronic control unit of the parking brake (B29), the conditions are met for, in accordance with W08, the electric parking brake to be able to be closed according to a predefined time/pressure characteristic curve. This relationship is also explained once more with reference to the functional diagrams. Together with the rise in the service brake pressure pB to p1 up to the time t1, the pressure in the spring-loaded cylinders pF drops according to the illustrated time/pressure characteristic curve. If the brake is no longer activated after the time t1, the pressures exhibit an inverted profile.

Figure 13:
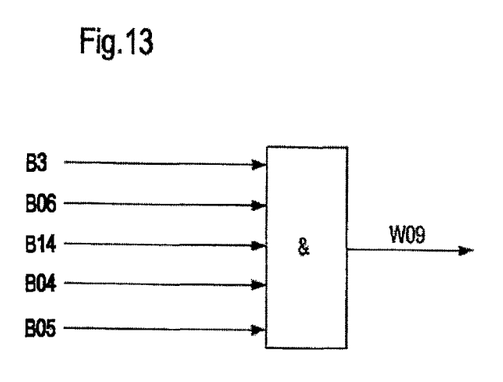
FIG. 13 is a diagram illustrating the deceleration of a vehicle using a manual control unit.

By reference to FIG. 13 it is possible to explain what is required for the manual control unit to operate as a signal transmitter when the vehicle decelerates. For this to occur the on-board diagnostics must not signal a fault (B04), the switch 70 of the manual control unit must be closed, in other words the signal S1 must be present (B05), the ignition must be switched on (B06), the engine must be running (B06), and the vehicle must be moving (B30). If all these conditions are met, it is possible for the electronic control unit of the electric parking brake to transmit a request to the electronic brake controller (EBC) to carry out a braking operation according to a time/pressure characteristic curve which is provided (W09). Such a braking operation on the basis of a closed switch of the manual control unit is explained with reference to the functional diagrams. While the switch 70 of the manual control unit is closed and, therefore, the signal S1 is present, the brake pressure of the service brake rises to the pressure level p2 and the pressure in the spring-loaded cylinders pF of the parking brake is maintained without modification, that is to say the parking brake remains opened. If the switch 70 is opened at the time t1, the signal S1 is no longer present and the pressure in the service brake can drop again, with the result that the braking effect decreases and ultimately disappears at the time t2.

The features of the invention which are disclosed in the description above, in the drawings and in the claims implemented the invention either individually or else in any desired combination.

Table of reference numerals

| | |
|---|---|
| 10 | Electronic control unit |
| 12 | Manual control unit |
| 14 | Activation element for closing the parking brake |
| 16 | Activation element for releasing the parking brake |
| 18 | Microcontroller |
| 20 | Analog/digital converter |
| 22 | Switching logic |
| 24 | Switch |

| | |
|---|---|
| 26 | Watchdog timer |
| 28 | Power unit |
| 30 | Redundant voltage supply |
| 32 | Shutdown relay |
| 34 | Parking brake pneumatics |
| 36 | Solenoid valves |
| 38 | EAC pneumatic interface |
| 40 | Trailer control module |
| 42 | Spring-loaded cylinder |
| 44 | Electronic transmission controller |
| 46 | Electronic engine controller |
| 48 | Electronic brake controller |
| 50 | Brake pressure modulator |
| 52 | Central electronic control unit |
| 54 | CAN bus |
| 56 | CAN interface |
| 58 | CAN interface |
| 60 | Direct outputs |
| 62 | Pressure sensor |
| 64 | Pressure sensor |
| 66 | Pressure sensor |
| 68 | Pressure sensor |
| 70 | Switch |
| 72 | Switch |
| 74 | Switch |
| 76 | Schmitt trigger circuit |
| 78 | Coupling element for input voltage |
| 80 | Switch |
| 82 | Bolt |
| 84 | Tension spring |
| 86 | Tension spring |
| 88 | Slope |
| 90 | Slope |
| 92 | Momentary contact switch |
| 94 | Momentary contact switch |
| 96 | Slope |
| 98 | Momentary contact switch |
| 100 | Slope |
| 102 | Sliding block |
| 104 | Opening |
| 106 | Slope |
| 108 | Momentary contact switch |
| 110 | Accumulator |
| 112 | Controller |
| 114 | Light emitting diode |
| 116 | Light signal |

The invention claimed is:

1. A method for controlling a pneumatic brake system of a utility vehicle having a service brake and an electric parking brake, wherein an electronic control unit controls the electric parking brake, wherein, in an event of a circuit defect in the service brake, braking of the moving utility vehicle is assisted by the parking brake, and further wherein the electronic control unit controls the electric parking brake to provide braking assistance via venting spring-loaded cylinders of the parking brake in accordance with a predefined time/pressure characteristic curve.

2. The method as claimed in claim 1, wherein different time/pressure characteristic curves are used as a function of a speed of the utility vehicle.

3. The method as claimed in claim 1, wherein different time/pressure characteristic curves are used as a function of a faulty brake circuit of the utility vehicle.

4. The method as claimed in claim 2, wherein different time/pressure characteristic curves are used as a function of a faulty brake circuit of the utility vehicle.

5. The method as claimed in claim 1, wherein defined conditions have to be met for the parking brake to close, including:
a switched on ignition; and
a speed of the utility vehicle below a predetermined threshold speed.

6. The method as claimed in claim 2, wherein defined conditions have to be met for the parking brake to close, including:
a switched on ignition; and
a speed of the utility vehicle below a predetermined threshold speed.

7. The method as claimed in claim 3, wherein defined conditions have to be met for the parking brake to close, including:
a switched on ignition; and
a speed of the utility vehicle below a predetermined threshold speed.

8. The method as claimed in claim 5, wherein the presence of a sufficiently low speed of the utility vehicle is determined by comparing a wheel speed, a vehicle speed output of a controller, and a rotational speed of a transmission, with predefined threshold values.

9. The method as claimed in claim 6, wherein the presence of a sufficiently low speed of the utility vehicle is determined by comparing a wheel speed, a vehicle speed output of a controller, and a rotational speed of a transmission, with predefined threshold values.

10. The method as claimed in claim 7, wherein the presence of a sufficiently low speed of the utility vehicle is determined by comparing a wheel speed, a vehicle speed output of a controller, and a rotational speed of a transmission, with predefined threshold values.

11. A method for controlling a pneumatic brake system of a moving utility vehicle having a service brake and an electric parking brake utilizing spring-loaded cylinders, the method comprising the acts of:
controlling the electric parking brake via an electronic control unit; and
utilizing the parking brake to assist in braking the utility vehicle in an event of a circuit defect in the service brake,
wherein the parking brake is controlled by the electronic control unit to be utilized to provide braking assistance by venting the spring-loaded cylinders of the parking brake as a function of a predefined time/pressure characteristic curve.

12. The method as claimed in claim 11, wherein different time/pressure characteristic curves are used as a function of the speed of the utility vehicle.

13. The method as claimed in claim 12, wherein different time/pressure characteristic curves are used as a function of the circuit defect in the service brake of the utility vehicle.

14. The method as claimed in claim 11, wherein the parking brake is utilized to assist in braking the utility vehicle only upon:
a switched-on ignition; and
a sufficiently low speed of the utility vehicle.

* * * * *